US005372672A

United States Patent [19]

Seifert et al.

[11] Patent Number: 5,372,672

[45] Date of Patent: Dec. 13, 1994

[54] APPARATUS FOR MECHANICALLY REMOVING CIRCUMFERENTIALLY COMPLETE SHEETS FROM CONTAINERS

[75] Inventors: Günter Seifert, Burg; Jens Naecker, Hamburg, both of Germany

[73] Assignee: Alfill Getranketecnik GmbH, Hamburg, Germany

[21] Appl. No.: 75,163

[22] Filed: Jun. 10, 1993

[30] Foreign Application Priority Data

Jun. 11, 1992 [DE] Germany ............................ 4219051

[51] Int. Cl.[5] ............................................ B32B 35/00

[52] U.S. Cl. ........................................ 156/584; 83/18; 83/100; 83/175; 83/176; 83/946; 414/412; 156/344

[58] Field of Search .................... 156/344, 584; 83/18, 83/27, 100, 175, 176, 425, 946; 30/90.4; 29/402.03; 414/412

[56] References Cited

U.S. PATENT DOCUMENTS 4,158,417 6/1979 Inoue .................................. 414/412
4,219,299 8/1980 Watson ............................... 414/412
4,944,832 7/1990 Abe et al. ............................ 156/584
4,997,329 3/1991 Hanamoto et al. ................. 414/412
5,069,594 12/1991 Bott et al. ........................... 414/412

FOREIGN PATENT DOCUMENTS 55-48117 4/1980 Japan .................................. 414/412
1-18223 7/1989 Japan .................................. 414/412

*Primary Examiner*—Mark Osele
*Attorney, Agent, or Firm*—Darby & Darby

[57] ABSTRACT

Apparatus for mechanically removing circumferentially complete labels from cylindrical external surfaces of successive containers, such as bottles, which are transported in upright or horizontal position past a removing station has a mechanical or pneumatic device which withdraws a portion of the label from the external surface of a container at the removing station. This establishes a clearance for a distancing element at the leading end of a knife which is moved axially of the external surface at the removing station to sever the label from one marginal portion all the way to the other marginal portion of the label. The thus split labels are attracted by an evacuating conveyor as soon as the respective containers advance beyond the removing station.

13 Claims, 5 Drawing Sheets

APPARATUS FOR MECHANICALLY REMOVING CIRCUMFERENTIALLY COMPLETE SHEETS FROM CONTAINERS

BACKGROUND OF THE INVENTION

The invention relates to improvements in apparatus for relieving containers of labels, foils or other types of sheets. More particularly, the invention relates to improvements in apparatus which can be utilized with advantage to remove circumferentially complete labels from normally cylindrical external surfaces of bottles, cans or other types of containers.

It is known to provide PET bottles with circumferentially complete hollow cylindrical labels which do not or need not adhere to the external surfaces of the bottles but are held in place only because they closely follow the outlines of cylindrical external surfaces of the respective bottles. The end portions of each label overlie and adhere to each other and the axial length of each label is determined by the distance between the two ring-shaped marginal portions of the respective label. Problems arise when the containers, particularly bottles which are to be reused, undergo treatment prior to being admitted into a filling machine, e.g., a machine which refills the containers with a carbonated beverage wine, water or another liquid. The treatment involves removal of old labels prior to refilling and such removal often involves contacting the labels with aggressive solvents which are likely to affect the appearance of the containers. The likelihood of damaging the containers is particularly pronounced when the labels are relatively large, e.g., when the labels are circumferentially complete cylinders each of which completely surrounds a rather large portion of the external surface of the respective container. Such large labels can be removed by subjecting them to the action of large quantities of aggressive solvents which are highly likely to deface large portions of external surfaces of the respective containers. Moreover, the utilization of a large quantity of solvent contributes to the cost of treatment reusable containers

OBJECTS OF THE INVENTION

An object of the invention is to provide an apparatus which can mechanically remove labels, foils and/or other sheets from bottles, cans or other types of containers.

Another object of the invention is to provide an apparatus which can mechanically remove circumferentially complete hollow cylindrical sheets from normally cylindrical external surfaces of bottles, cans or other containers.

A further object of the invention is to provide an apparatus which can remove labels and/or other types of sheets from bottles or other containers in an ecologically acceptable manner.

An additional object of the invention is to provide an apparatus which can remove labels at a rate corresponding to the rate of other treatments of reusable (refillable) bottles or other containers.

Still another object of the invention is to provide the apparatus with novel and improved means for facilitating predictable and rapid removal of labels from containers.

A further object of the invention is to provide a novel and improved method of removing labels or other types of sheets from cans, bottles or other types of containers.

Another object of the invention is to provide a novel and improved severing device for labels, such as circumferentially complete labels which surround cylindrical external surfaces of bottles or other types of containers.

An additional object of the invention is to provide an apparatus for rapid and predictable removal of labels from bottles or other containers which are transported in upright or horizontal positions.

Still another object of the invention is to provide the apparatus with novel and improved means for manipulating circumferentially complete labels prior to their separation from containers.

SUMMARY OF THE INVENTION

The invention resides in the provision of an apparatus for relieving containers of cover sheets of the type wherein an internal surface of the cover sheet is adjacent to and is withdrawable from an external surface of the container. The improved apparatus comprises means for withdrawing at least a portion of the internal surface of a sheet away from the respective portion of the external surface of a container to thus establish a clearance between the aforementioned portions of the internal and external surfaces, means for severing the sheet in the region of the withdrawn portion of the internal surface, and means for establishing a relative movement of the container with the sheet thereon and the severing means.

If the apparatus is designed to relieve containers having substantially cylindrical external surfaces of cover sheets in the form of substantially cylindrical labels having a pair of spaced apart marginal portions and overlapping bonded-together end portions, the means for establishing a relative movement preferably includes means for moving the severing means from one marginal portion to the other marginal portion of a label. If the containers are bottles, the means for establishing a relative movement can include means for moving the severing means in substantial parallelism with the axis of the substantially cylindrical external surface of the bottle which is to be relieved of a label.

The severing means can be provided with a cutting edge which is inclined relative to the axis of the substantially cylindrical external surface of a container to be relieved of a label, and such severing means further comprises a distancing element which is adjacent the cutting edge. The means for establishing a relative movement can include means for moving the severing means in a predetermined direction in substantial parallelism with the axis of the cylindrical or substantially cylindrical external surface of the container to be relieved of a label and with the distancing element located ahead of the cutting edge, as seen in the predetermined direction, and extending into the clearance between the external and internal surfaces.

The severing means can comprise a knife and means for biasing the knife toward the external surface of a container which is to be relieved of a sheet.

In accordance with a presently preferred embodiment, the means for establishing a relative movement can include a linear drive having means for moving the severing means in substantial parallelism with the axis of the substantially cylindrical external surface of the container which is to be relieved of a label or another sheet and means for articulately connecting the severing means to the moving means.

The withdrawing means can include means for pneumatically withdrawing at least a portion of the internal surface of a sheet from the respective portion of the external surface of a container. Such pneumatically operated withdrawing means can comprise at least one sheet attracting member having a concave surface which is substantially complementary to the external surface of a container and suction ports in the concave surface as well as means for displacing the member substantially radially of the external surface of a container which is to be relieved of a sheet. The aforementioned member can be provided with an opening for the severing means.

Alternatively, the withdrawing means can comprise two spaced apart rotary sheet engaging elements and means for rotating the elements in opposite directions. The rotary elements can include or constitute friction wheels and at least a portion of at least one of such rotary element can be made of rubber or another elastomeric material.

The apparatus can further comprise means for conveying a series of containers past the withdrawing and severing means in substantially upright positions. The means for establishing a relative movement then preferably comprises means for moving the severing means substantially vertically relative to successive containers of the series.

Alternatively, the apparatus can further comprise means for conveying a series of containers past the withdrawing and severing means in substantially horizontal positions. The means for establishing a relative movement then preferably includes means for moving the severing means substantially horizontally relative to successive containers of such series.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
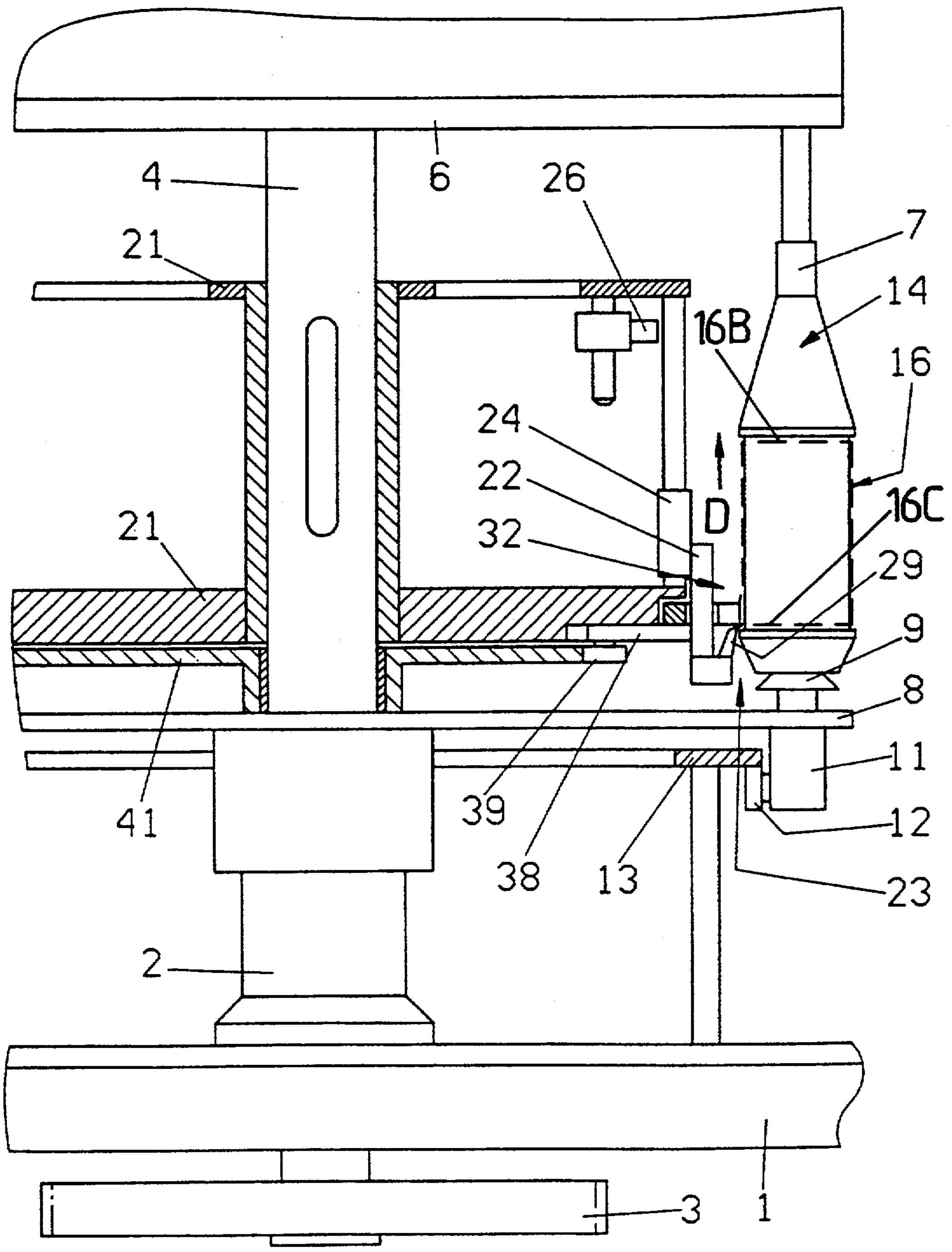
FIG. 1 is a fragmentary partly elevational and partly vertical sectional view of an apparatus which embodies one form of the invention and is designed to remove labels from upright containers.
Figure 2:
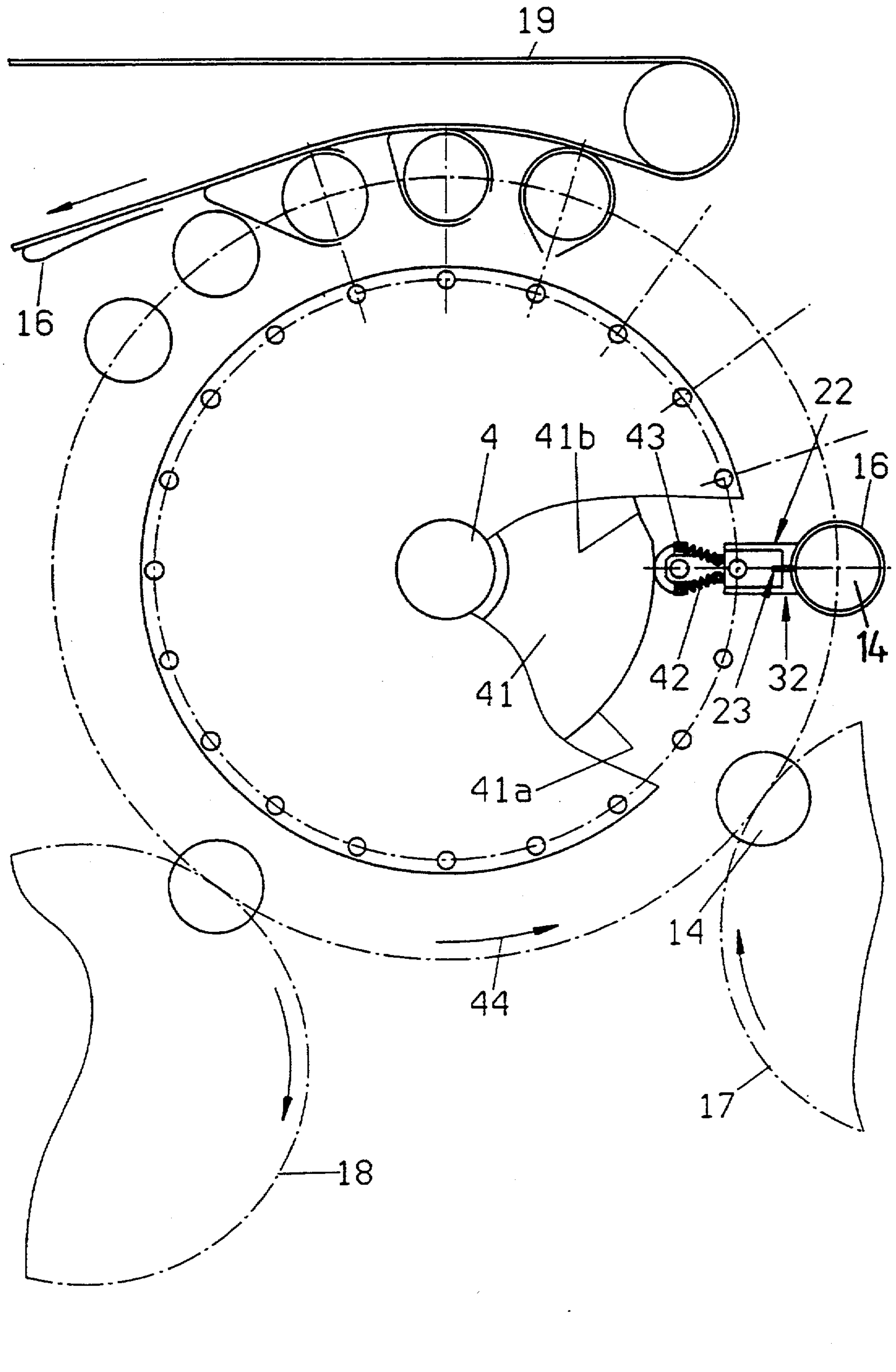
FIG. 2 is a smaller-scale schematic plan view of the apparatus of FIG. 1 and further shows means for supplying containers to the label removing station as well as means for receiving separated labels and means for receiving treated containers.
Figure 3:
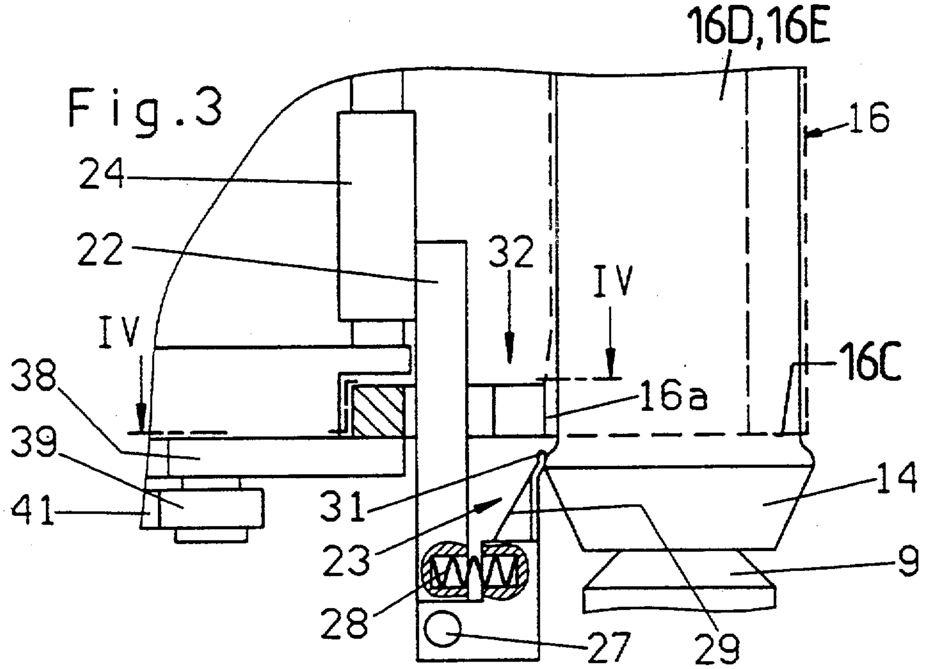
FIG. 3 is an enlarged view of a detail in the structure which is shown in FIG. 1.
Figure 4:
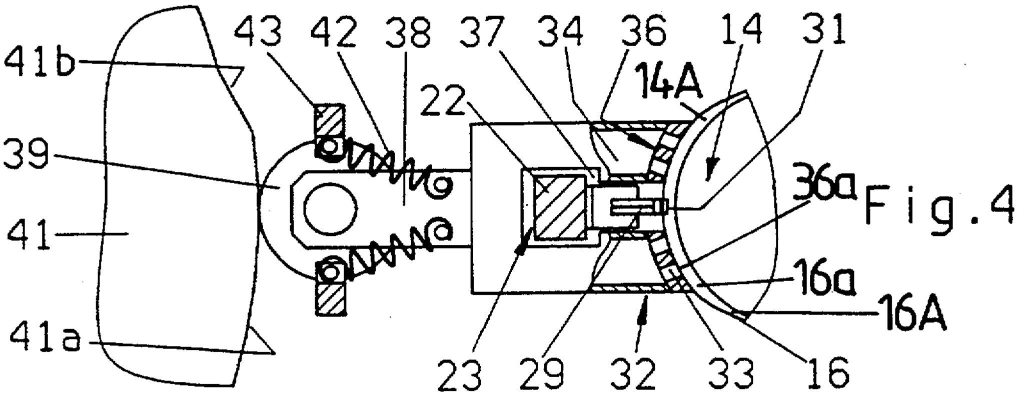
FIG. 4 is a horizontal sectional view substantially as seen in the direction of arrows from the line IV—IV in FIG. 3.

Referring first to FIGS. 1 to 4, there is shown an apparatus for mechanically relieving successive containers 14 of a series of equidistant containers of cover sheets 16 in the form of circumferentially complete labels surrounding substantially cylindrical external surfaces 14A of the respective containers. The illustrated containers 14 are PET bottles and each label 16 has an internal surface 16A which is normally closely adjacent to the external surface 14A of the respective bottle 14, two spaced-apart ring-shaped marginal portions 16B, 16C and two overlapping end portions 16D, 16E which are bonded to each other. Thus, a label 16 need not be bonded to the external surface 14A of the respective bottle 14.

The apparatus comprises a support or base 1 carrying an upright primary or main bearing 2 for an upright column 4 which extends downwardly beyond the support 1 and is rotated by a suitable prime mover including a driven gear or pulley 3. The upper end portion of the column 4 carries and transmits torque to a superstructure 6 forming part of means for conveying successive bottles 14 of a series of such bottles in upright position along an arcuate path having its center on the axis of the column 4. The superstructure 6 carries a series of equidistant bottle engaging and clamping heads 7 each of which engages and holds a discrete bottle 14 in upright position to cooperate in advancement of such bottles past a removing station where the bottles are mechanically relieved of their labels 16.

The column 4 further supports and transmits torque to a horizontal table 8 which supports the bottles 14 from below during advancement past the removing station. The upper side of the table 8 is provided with equidistant centering elements 9 each of which cooperates with a head 6 to maintain the corresponding bottle in an upright position. Each centering element 9 is movable up and down by a discrete elevator 11 having a cam 13 carried by the support 1 and followers 12 which are or which can be mounted on the centering elements 9 to lower such elements at a receiving station where successive bottles 14 of a series of such bottles are delivered to the table 8. The followers 12 cooperate with the cam 13 to lower the respective centering elements 9 at a discharging station where the bottles 14 leave the table 8.

The table 8 receives untreated (labelled) bottles 14 from a first turntable 17 at the receiving station, and a second turntable 18 at the discharging station receives treated bottles from the table 8. A pneumatic or other suitable conveyor 19 is provided downstream of the removing station to accept and evacuate separated labels 16, e.g., to deliver separated labels to storage or to a recycling unit (not shown) where the labels are processed in an ecologically acceptable manner.

The column 4 further supports and transmits torque to a rotor 21 which carries one but preferably several equidistant holders 22 for discrete mechanical severing units 23 adjacent the arcuate path for movement of bottles 14 from the turntable 17 toward the turntable 18. A linear drive 24 is provided for the holders 22 to move a knife 29 of the respective severing unit 23 from the marginal portion 16C to the marginal portion 16B of the respective label 16 or in the opposite direction. The extent of upward movement of the severing units 23 is monitored by one or more sensors 26 which are or which can be designed to determine the extent of upward movement of the knives 29 forming part of the respective severing units 23. The paths of vertical movement of the severing units 23 are or can be substantially parallel to the axes of the cylindrical external surfaces 14A of the adjacent bottles 14.

The severing units 23 are articulately connected to the respective holders 22 by pivot pins 27 and each knife 29 is urged toward the external surface 14A of the adjacent bottle 14 by a stressed coil spring 28 or by other suitable biasing means. The cutting edges of the knives 29 are inclined relative to the vertical axes of the adjacent cylindrical external surfaces 14A and the leading (upper) end of each such cutting edge is adjacent to a discrete distancing element 31 serving to extend into an arcuate clearance **16*a* between the external surface 14A of the adjacent bottle 14 and the internal surface 16A of the respective label 16. In accordance with a feature of the present invention, the clearances 16*a* are established pneumatically by at least one withdrawing unit 32 which includes a sheet attracting member 36 having a concave surface 36*a* which conforms to the convex surface 14*a* of the adjacent bottle 14. The member 36 has suction ports 33 which extend from the concave surface 36*a* to a suction chamber 34. The latter is connected to the intake of a suitable suction generating device (not shown) in any conventional manner not forming part of the present invention. The member 36 has an opening 37 which can receive the adjacent holder 22. The withdrawing unit 32 is movable in parallelism with the axis of the external surface 14A of the adjacent bottle 14 by a displacing device including an arm 38 on the member 36, a roller follower 39 on the arm 38, and a stationary cam 41 which is tracked by the follower 39. The arm 38 can move the member 36 radially of the adjacent cylindrical external surface 14A and away from the respective bottle 14. This causes the establishment of a clearance 16*a*. The roller follower 39 is biased against the cam 41 by one or more coil springs 42 which are installed between the lever or arm 38 and a pair of stationary retainers 43**.

The mode of operation of the apparatus of FIGS. 1 to 4 is as follows:

The turntable 7 is driven to continuously advance untreated (labelled) bottles 14 to the table 8 where the successively delivered bottles are engaged and temporarily held by a head 7 and the aligned centering element 9. The table 8 is driven in the direction of arrow 44. The centering elements 9 are raised and lowered by the elevator 11, i.e., by the roller follower(s) 12 in cooperation with the stationary cam 13.

As the table 8 continues to turn in the direction of arrow 44, the roller follower 39 advances along the portion **41*a* of the cam 41 and causes the member 36 to approach the external surface of the adjacent label 16 so that the suction ports 33 can attract the adjacent portion of the label and move such portion of the label away from the external surface 14A of the bottle 14 while the roller follower 39 tracks the portion 41*b* of the cam 41. This results in the formation of a clearance 16*a*. The linear drive 24 thereupon moves the severing unit 23 upwardly to advance the distancing element 31 into the clearance 16*a* at the marginal portion 16C of the label 16. The cutting edge of the knife 29 follows the distancing element 31 and severs the label 16 from the marginal portion 16C to the marginal portion 16B. The thus split label 16 is taken over and advanced by the conveyor 19 while the corresponding bottle 14 (which has been relieved of its label 16) advances toward and is taken over by the turntable 18**.

The conveyor 19 is or can be driven at a speed which exceeds the speed of the table 8 to thus ensure reliable removal of split labels 16 before the corresponding bottles 14 reach the turntable 18. As mentioned before, the conveyor 19 can be foraminous and its lower reach is then adjacent a suction chamber (not shown) which ensures that the split labels 16 which are delivered by the respective bottles 14 are reliably segregated from such bottles ahead of the turntable 18.

The drive 24 returns the severing unit 23 to its lower end position as soon as the severing of a label 16 is completed.

Figure 5:
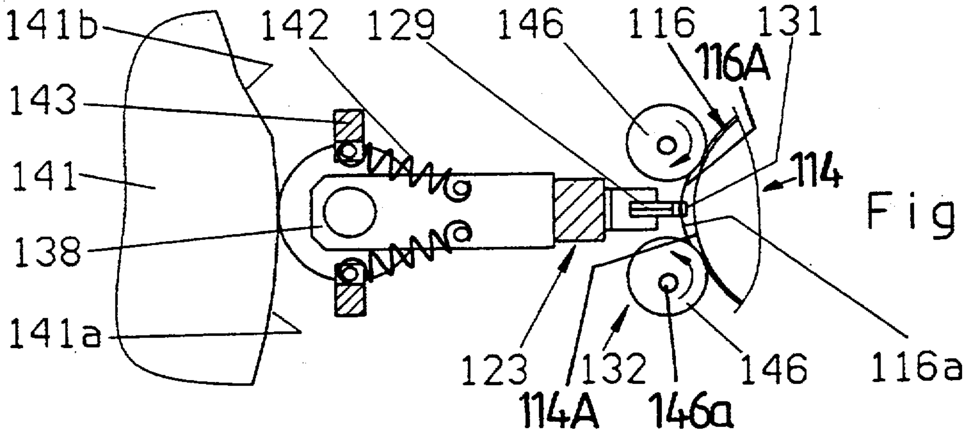
FIG. 5 is a horizontal sectional view similar to that of FIG. 4 but showing modified withdrawing means.

The apparatus which includes the structure of FIG. 5 is similar to the first apparatus of FIGS. 1 to 4, and all such parts which are identical with or analogous to corresponding parts of the first apparatus are denoted by similar reference characters plus 100. The main difference is that the withdrawing unit 132 employs two spaced apart rotary sheet engaging elements 146 which are driven in opposite directions by shafts **146*a*. At least one of the rotary elements 146*a* can constitute a friction wheel and at least a portion of at least one of these elements can be made of rubber or other elastomeric material. When the elements 146 approach the adjacent bottle 114 and engage the external surface of the label 116, they move a portion of the internal surface 116A away from the external surface 114A to thus establish the clearance 116*a*. The axes of the elements 146 are or can be parallel to the axis of the cylindrical external surface 114A and the two elements 146 are preferably mirror images of each other with reference to a plane which includes the axis of the adjacent external surface 114A**.

The distancing element 131 and the knife 129 of the severing unit 123 operate in the same way as described with reference to the severing unit 23.

Figure 6:
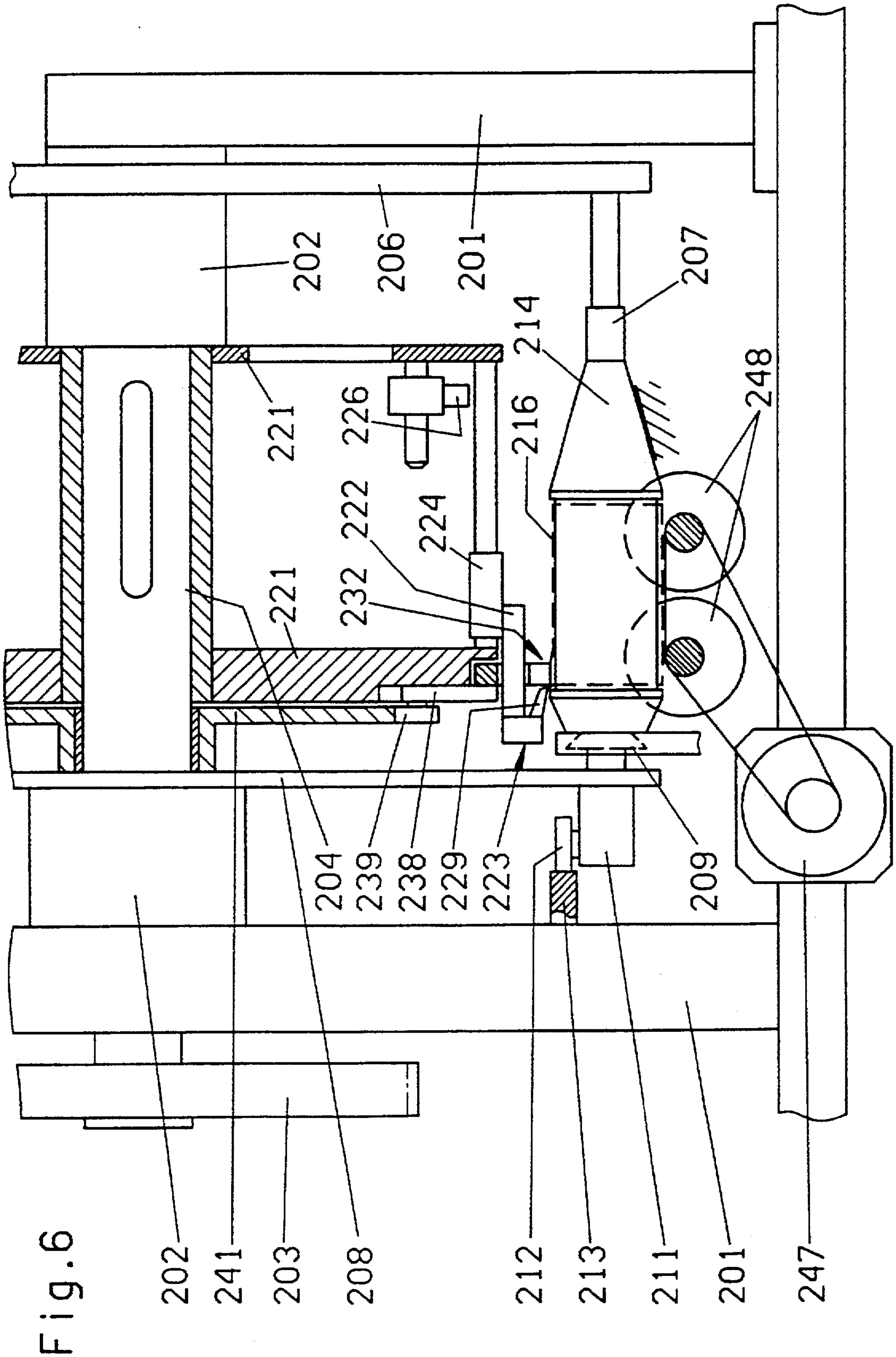
FIG. 6 is a fragmentary partly elevational and partly vertical sectional view of a modified apparatus designed to remove labels from containers which are maintained in horizontal position.
Figure 7:
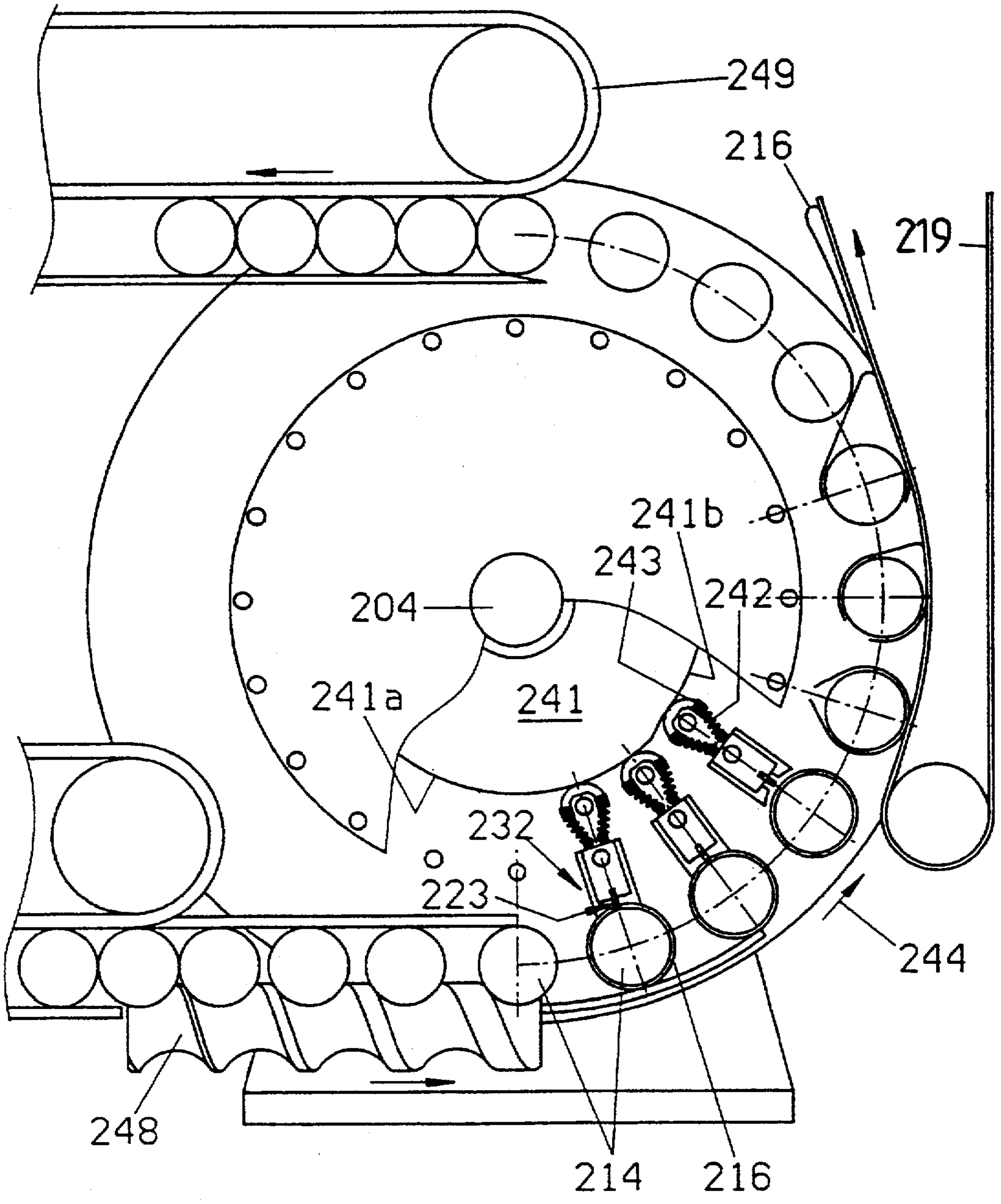
FIG. 7 is a smaller-scale elevational view of the apparatus which embodies the structure of FIG. 6.

FIGS. 6 and 7 illustrate a third apparatus which is designed to relieve the containers of labels while the containers are maintained in horizontal positions. All such parts of the third apparatus which are identical with or clearly analogous to the corresponding parts of the first apparatus (shown in FIGS. 1 to 4) are denoted by similar reference characters plus 200.

The means for conveying successive bottles 214 of a series of such bottles past the severing unit 223 and the unit 224 which effects a movement of the bottles 214 with their labels 216 and the severing unit 223 relative to each other are constructed and operated in such a way that the knife or knives 229 move along a horizontal path during severing of the adjacent label or labels 216. The conveying means comprises horizontal feed screws 248 which are rotated by a motor 247 or another suitable prime mover. The convolutions of the feed screws 248 are such that the bottles 214 are equidistant from each other not later than when they arrive at the label removing station. The reference character 249 denotes a conveyor which serves to remove the bottles 214 while the axes of the bottles remain horizontal and while the bottles are being lifted from a lower level to a higher level.

An important advantage of the improved apparatus is that it includes means for mechanically removing the labels (cover sheets) from the respective containers (e.g., bottles). This practically eliminates the likelihood of damage to the containers and renders it possible to deliver the treated containers directly to a refilling apparatus or to a labelling apparatus.

The distancing element or elements ensure that the cutting edge(s) of the knife or knives can sever the labels without touching the containers, and the withdrawing unit or units ensure that the distancing element(s) can enter the clearances (such as 16*a*) to ensure that each label is split all the way from one marginal portion to the other marginal portion.

The feature that the cutting edge(s) of the knife or knives are inclined relative to the axes of external surfaces of the adjacent containers ensures that each knife can make a clean cut all the way between the two marginal portions of the respective labels. Each distancing element can constitute an integral part of the respective knife. Reliable severing of labels all the way between their marginal portions is further ensured by the biasing means (such as 28) which urges the knife or knives toward the external surface of the adjacent container.

An additional feature of the improved apparatus is that it can treat containers at the rate at which the containers receive liquid in a filling machine or at which the containers are treated in a labelling machine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for relieving a container, which has a substantially cylindrical external surface, of a cover sheet that has an internal surface adjacent to and withdrawable from the external surface of the container, comprising means for withdrawing at least a portion of the internal surface of the cover sheet away from a portion of the external surface of the container to thus establish a clearance between said portions of the internal and external surfaces; means for severing the cover sheet in a region of the portion of the internal surface that has been withdrawn, said severing means comprising a cutting edge that is inclined relative to an axis of the cylindrical external surface of the container and comprising a distancing element adjacent said cutting edge; and means for establishing a relative movement of the container with the sheet thereon and the severing means, said means for establishing including means for moving said severing means in a predetermined direction in substantial parallelism with the axis of the cylindrical external surface of the container and with the distancing element located ahead of said cutting edge, as viewed in said direction, and extending into a clearance between the external and internal surfaces.

2. The apparatus of claim 1 wherein the cover sheet is in the form of a substantially cylindrical label having a pair of spaced apart marginal portions and overlapping bonded-together end portions, said means for moving is for moving said severing means from one marginal portion to the other marginal portion of the label.

3. The apparatus of claim 2, wherein said container is a bottle which is to be relieved of the label.

4. The apparatus of claim 1, wherein said severing means comprises a knife having said cutting edge and means for biasing the knife toward the external surface of the container to be relieved of the sheet.

5. The apparatus of claim 1 wherein said means for establishing a relative movement includes a linear drive having means for moving the severing means in substantial parallelism with the axis of the external surface of the container to be relieved of the sheet and means for articulately connecting said severing means to said moving means.

6. The apparatus of claim 1, wherein said withdrawing means includes means for pneumatically withdrawing at least a portion of the internal surface of the sheet from a respective portion of the external surface of a container.

7. The apparatus of claim 6 wherein said withdrawing means comprises at least one sheet attracting member having a concave surface substantially complementary to the external surface of the container and suction ports in said concave surface, and means for displacing said member substantially radially of the external surface of the container to be relieved of the sheet.

8. The apparatus of claim 7, wherein said member has an opening and said severing means extends into said opening.

9. The apparatus of claim 1, wherein said withdrawing means comprises two spaced apart rotary sheet-engaging elements and means for rotating said elements in opposite directions.

10. The apparatus of claim 9, wherein said rotary elements include friction wheels.

11. The apparatus of claim 9, wherein at least one of said rotary elements consists at least in part of an elastomeric material.

12. The apparatus of claim 1, further comprising means for conveying a series of containers past said withdrawing and severing means in substantially upright positions, said means for establishing a relative movement including means for moving said severing means substantially vertically relative to successive containers of said series.

13. The apparatus of claim 1, further comprising means for conveying a series of containers past said withdrawing and severing means in substantially horizontal positions, said means for establishing a relative movement including means for moving said severing means substantially horizontally relative to successive containers of said series.

* * * * *

UNITED STATES PATENT AND TRADEMARK OFFICE

CERTIFICATE OF CORRECTION

PATENT NO. : 5,372,672

DATED : December 13, 1994

INVENTOR(S) : Günter SEIFERT and Jens NAECKER

It is certified that error appears in the above-indentified patent and that said Letters Patent is hereby corrected as shown below:

Title Page, [73] Assignee:, change "Getranketecnik" to --Getranketechnik--.

Signed and Sealed this

Twenty-eight Day of February, 1995

Attest:

BRUCE LEHMAN

*Attesting Officer* *Commissioner of Patents and Trademarks*